United States Patent [19]
Satoh

[11] 4,005,486
[45] Jan. 25, 1977

[54] APPARATUS FOR DETECTING TAPE RUNNING IN A TAPE RECORDER

[75] Inventor: Ken Satoh, Hachioji, Japan

[73] Assignee: Olympus Optical Co., Ltd., Tokyo, Japan

[22] Filed: May 28, 1975

[21] Appl. No.: 581,624

[30] Foreign Application Priority Data

June 3, 1974 Japan .................. 49-64264[U]
June 3, 1974 Japan .................. 49-64265[U]

[52] U.S. Cl. .................. 360/79; 340/259; 360/74
[51] Int. Cl.² .................. G11B 15/06; G11B 23/30; G11B 31/00
[58] Field of Search .................. 360/79, 74, 73, 71, 360/72, 90, 13; 340/259, 260; 318/311, 313, 317

[56] References Cited

UNITED STATES PATENTS

| | | | |
|---|---|---|---|
| 3,562,441 | 2/1971 | Bretschneider | 360/73 |
| 3,573,393 | 4/1971 | Blackie et al. | 360/74 |
| 3,650,263 | 3/1972 | Kowalski | 360/74 |
| 3,660,810 | 5/1972 | Yoshii | 340/259 |
| 3,694,585 | 9/1972 | Goldner | 360/74 |
| 3,932,889 | 1/1976 | Takeda | 360/74 |

FOREIGN PATENTS OR APPLICATIONS 4,613,468 2/1968 Japan .................. 360/74

OTHER PUBLICATIONS

C. D. Carman et al., IBM Technical Disclosure Bulletin, End of Record Warning Circuits, vol. 7, No. 11, Apr. 1965, pp. 991–992.

*Primary Examiner*—Alfred H. Eddleman

[57] ABSTRACT

An apparatus for detecting tape running in a tape recorder includes an AND circuit to which are applied an output signal of a generator which produces an audio signal and an output signal from a tape running detector which detects the running of a magnetic tape and produces a fixed output signal when a tape end is reached. An output signal from the AND circuit which corresponds to the audio signal is applied to a loudspeaker contained within the tape recorder for audibly warning that a tape end has been reached.

3 Claims, 3 Drawing Figures

APPARATUS FOR DETECTING TAPE RUNNING IN A TAPE RECORDER

BACKGROUND OF THE INVENTION

The invention relates to an apparatus for detecting tape running in a tape recorder, and more particularly to such apparatus in which the running of a tape in a tape recorder is monitored, and when the running of the tape has reached a terminal end thereof, the termination of the magnetic tape being recorded or reproduced is signified to a user by an audible alarm or visual display. Conventional tape recorders are provided with various kinds of devices which are designed to detect the running of the magnetic tape and to signify to a user when a tape being recorded or reproduced has reached a terminal end thereof. In one example, a terminal end of the tape is applied with an electrically conductive foil, which is detected to operate an alarm buzzer. In another example, the tension in the tape is utilized to detect that the terminal end of the tape is reached to thereby operate a mechanical stop mechanism for automatically interrupting a tape drive motor.

However, these proposed devices are complex in arrangement in that the conductive foil is applied to the terminal end of the tape or the mechanical stop mechanism is assembled into the recorder. In addition, these devices occupy a substantial proportion of available space within the recorder, which renders them inadequate for use in a miniature tape recorder using a micro tape cassette. As is well recognized, a tape recorder using a micro tape cassette is greatly reduced in size, preventing the mechanical stop mechanism from being assembled into the recorder. Also the micro tape cassette has a size comparable to that of a small pack of matches, so that it is difficult to apply a further processing to the tape contained therein. However, it is highly desirable that some means for warning of the arrival of terminal end of the tape to a user be provided in the tape recorder using the micro tape cassette, since otherwise the user may be left unnoticed of the lack of available length of the tape, resulting in an irreparable loss of significant information.

On the other hand, in a tape recorder using a storage battery as a drive source, it is necessary to check whether the battery maintains a reference voltage which is required for the normal operation of the recorder, and to indicate the result of the checking operation. If the battery voltage is reduced below the reference voltage, the battery must be replaced for proper operation of the recorder since it is exhausted.

When the magnetic tape is driven for running from the battery supply, it is desirable to provide some means for indicating the tape running. A tape cassette is usually provided with a transparent window through which the tape running can be recognized. However, some tape recorders are constructed such that the window in the tape cassette loaded in position is covered by a covering plate of the recorder, thereby preventing a visual inspection of the running of the internal tape through the window. Therefore, it will be favorable to provide for the recognition of the tape running separately from a visual inspection through the transparent window. However, it is undesirable to provide separate indications of the tape running and battery voltage in view of the space limitation and the economical considerations. Thus, it will be appreciated that the combined indication will be highly desirable.

SUMMARY OF THE INVENTION

It is a first object of the invention to overcome the above mentioned disadvantages of conventional tape end detectors by providing an apparatus for detecting tape running in a tape recorder which utilizes the playback function of the recorder, or specifically the loudspeaker thereof, in combination with an AND circuit producing an audible alarm from the loudspeaker when a tape running detector has detected a terminal end of the tape.

In accordance with the invention, a combination of a simple audio frequency generator, a tape running detector, an AND circuit and a loudspeaker contained within a tape recorder can provide an audible alarm of the end of the running tape. This permits the apparatus to be constructed as a compact unit, which can be incorporated into a miniature tape recorder using a micro tape cassette.

Alternatively, the audio frequency generator which produces an acoustic signal can be omitted and replaced by the provision for deriving an a.c. component which is produced as noises from a d.c. motor which is used as a drive source for running the tape. This further reduces the space and the cost of the apparatus.

DETAILED DESCRIPTION OF THE PREFERRED EMBODIMENTS OF THE INVENTION

Figure 1:
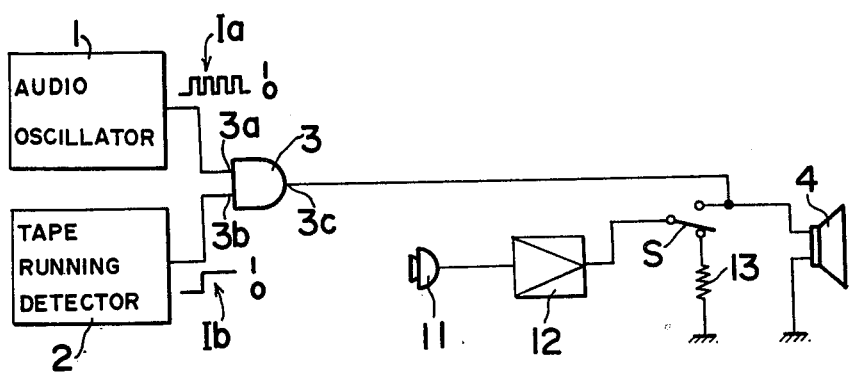
FIG. 1 is an electrical circuit diagram of the apparatus according to one embodiment of the invention.

Referring to FIG. 1, the embodiment shown comprises a generator 1 which produces a fixed output signal of audio frequency, a tape running detector 2 which produces no output signal during the running of a tape, but produces an output signal when a terminal end of the tape is reached, an AND circuit 3, and a loudspeaker 4 which is contained within a tape recorder associated with the apparatus of the invention.

Figure 2:
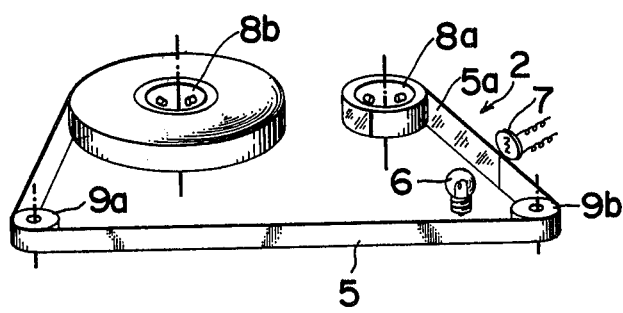
FIG. 2 is a perspective view of a tape running detector used in the apparatus shown in FIG. 1.

In the present embodiment, the generator 1 is formed as a pulse oscillator which produces a fixed output signal $Ia$ of audio frequency. The oscillator may be of any conventional type such as, for example, a multivibrator as described in the text Electronic and Radio Engineering, copyright 1955 by McGraw-Hill Book Company and described at pages 625–641 and 795 and 796. The output signal $Ia$ is applied to one input terminal 3a of the AND circuit 3. The detector 2 may be formed as illustrated in FIG. 2 wherein it comprises a light emitting element 6 such as lamp and a light receiving element 7, which are disposed on the opposite sides of a magnetic tape 5 for detecting the transmission of light through the tape for indication of a terminal end thereof. As is well known, a cassette tape has its one end secured to one of tape hubs, 8a, and extends therefrom around a pair of guide rollers 9a, 9b to be secured to the other hub 8b at its other end. When the tape 5 is driven by a capstan and a pinch roller under control of a drive motor M (FIG. 3), both not shown, the tape is unreeled from one of the hubs and taken up on the other hub. The tape 5 comprises a thin polyester film base which is coated with a magnetizable material. The base is transparent while the magnetizable material is black or black and brown in color. Both terminal ends of the tape 5 are formed as leaders 5a which are not applied with the magnetizable material, and which are hence transparent to permit an optical detection. In view of the difference in the light transmittivity between the coated and uncoated portions of the tape, the detector 2 produces an output signal as shown at Ib in FIG. 1 from the light receiving element 7 when it has detected the terminal end 5a of the tape. The output signal from the detector 2 is applied to the other input terminal 3b of the AND circuit 3. The output terminal 3c of the AND circuit 3 is connected with the loudspeaker 4 contained within the tape recorder.

In operation, during the record mode, the output pulse Ia from the generator 1 is applied to the AND circuit 3 while the output signal Ib from the detector 2 remains substantially null when there is still a length of the tape on which a recording can be made, so that the AND circuit 3 produces no output. However, when a tape end is reached and the detector 2 detects the terminal end 5a of the tape, the output signal Ib therefrom rises to 1 level, whereby the AND circuit 3 passes the pulse output Ia and applies it to the loudspeaker 4, allowing it to give off an audible alarm. As a consequence, the user is signified of the fact that the tape end is reached, indicating the lack of any tape length available for the recording.

Figure 3:
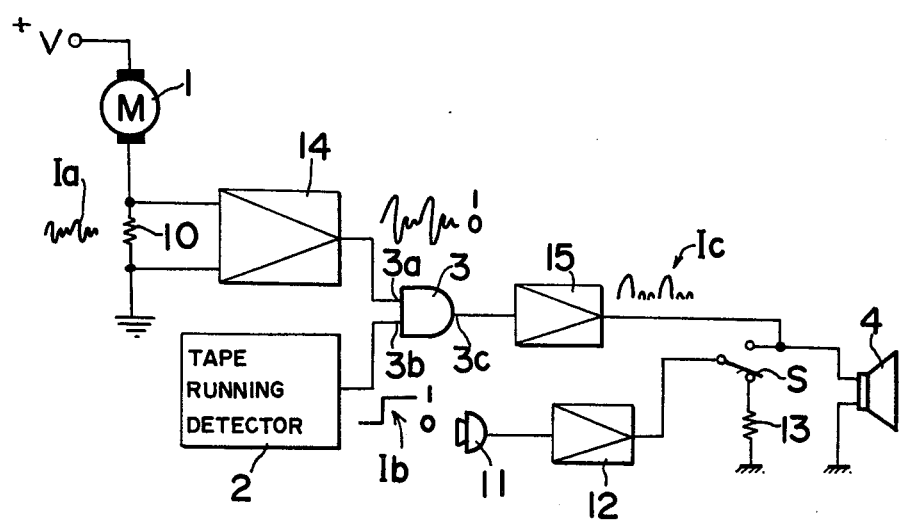
FIG. 3 is an electrical circuit diagram of another embodiment of the invention.

In the embodiment shown in FIG. 3, the generator 1 is replaced by a d.c. motor M having an output shaft (not shown) which is used as a drive source for running the tape. In a tape recorder using a d.c. motor as a drive source for running the tape, the interruption of an electrical contact between the brush and the commutator of the motor causes a periodic change in the current flow through the motor which is of a frequency within the audio range. In the present embodiment, the varying current component produced by the motor is derived and fed as an audio signal to the loudspeaker for giving off an audible alarm therefrom when a tape end is reached. In FIG. 3, the varying current is shown at Ia, which is applied to a resistor 10 and thence fed to an amplifier 14 for application to one input terminal 3a of the AND circuit 3. The output signal Ib from the tape running detector 2 is applied to the other input terminal 3b of the AND circuit 3. The detector 2 may be similar to that used in the previous embodiment, and thus may be constructed as shown in FIG. 2. When the detector 2 detects the terminal end 5a of the tape, its output signal Ib will be raised from 0 to 1, as shown. The output terminal 3c of the AND circuit 3 is connected with an amplifier 15 which has its output terminal connected with the loudspeaker 4 contained within the tape recorder.

In operation, during the record mode, the output signal Ib from the detector 2 remains substantially at 0 level when there is a length of the tape available for the recording, so that the AND circuit 3 produces no output. However, when a tape end is reached and the detector 2 detects the transparent terminal end 5a of the tape (see FIG. 2), the output signal therefrom is raised to 1 level, which is applied to the AND circuit 3 to permit the upper half of the varying current signal Ia of the motor M, applied through the amplifier 14, to be passed therethrough and to appear at its output terminal 3c. The resulting current signal is amplified by the amplifier 15 to provide an alarm signal Ic applied to the loudspeaker 4, which therefore gives off an audible alarm. This signifies to the user that the tape end is reached and there is no longer any length of the tape which is available for the recording.

It is to be noted that the waveform of the varying current Ia from the motor M contains a number of harmonic components, which can be filtered by a suitable waveform shaper to produce a simple tone as the audible alarm.

In the above embodiment, the detector 2 comprised a light emitting element 6 such as lamp and a light receiving element 7, but any other form of detector can be used. For example, the tension produced in the tape when the tape end is reached can be utilized to activate a switch for producing an output to the AND circuit 3 which varies from 0 to 1.

In FIG. 3, a monitor circuit is shown as comprising a microphone 11, an amplifier 12, a change-over switch S and a resistor 13. The monitor circuit can monitor the recording operation by changing the switch S to the other position in which it is connected with the loudspeaker 4.

What is claimed is:

1. An apparatus for detecting tape running in a tape recorder comprised of a pair of reels and a tape having at least its opposite ends connected to respective ones of said reels; a battery and tape driving means for driving said tape including motor means being connectible to said battery for operating the driving means; the terminal end portions of the tape being different from the portion of the tape provided for recording signals; said detector means comprising means for producing an audio signal of a fixed frequency when connected to said battery, a tape running detector means for producing an output signal when it has detected the passage of a terminal end portion of the magnetic tape used in the tape recorder, an AND gate circuit for producing an output signal of an audio frequency corresponding to the fixed frequency of the audio signal producing means responsive to an output signal from the detector and a signal from the generator, and a loudspeaker contained within the tape recorder, the output signal from the AND circuit being applied to the loudspeaker for developing an audible alarm indicative of a tape end.

2. An apparatus according to claim 1 in which the generator comprises oscillator means which produces a fixed output signal of an audio frequency.

3. An apparatus according to claim 1 in which the motor means comprises a d.c. motor used as a drive source for running the magnetic tape and which produces a varying current of an audio frequency as a result of interruption of an electrical contact between a brush and a commutator thereof; said generator means comprising means for sensing the signal across said d.c. motor and coupling a portion of said signal to one input of said AND gate circuit.

* * * * *